No. 893,794. PATENTED JULY 21, 1908.
L. GIRARDOT.
FLEXIBLE AND ELASTIC SHAFT COUPLING.
APPLICATION FILED NOV. 20, 1905.
FIG_1_
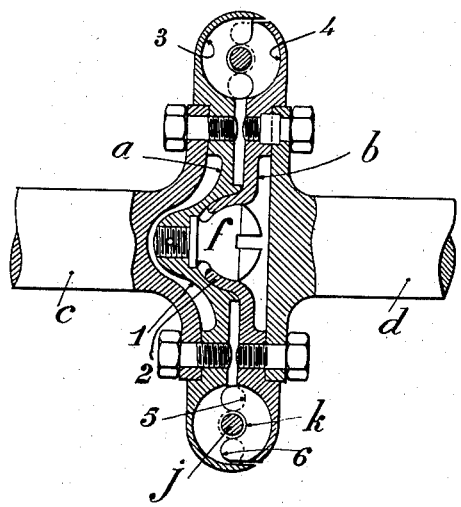
FIG_2_
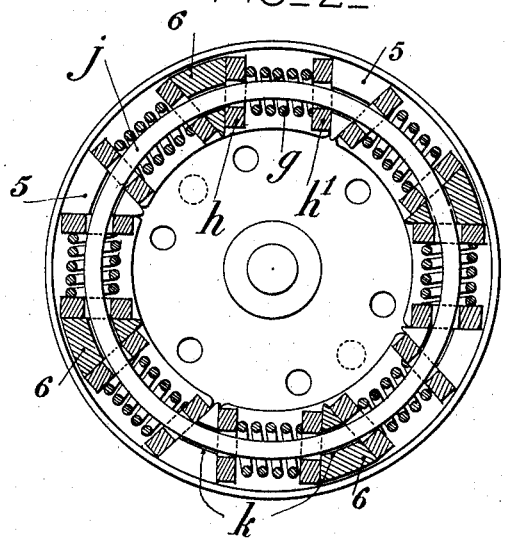
WITNESSES
W. P. Burk
W.H. Kennedy
INVENTOR
Léonce Girardot
By Richards Co.
ATTY.

UNITED STATES PATENT OFFICE.

LÉONCE GIRARDOT, OF PUTEAUX, FRANCE.

FLEXIBLE AND ELASTIC SHAFT-COUPLING.

No. 893,794.  Specification of Letters Patent.  Patented July 21, 1908.

Application filed November 20, 1905. Serial No. 288,284.

*To all whom it may concern:*

Be it known that I, LÉONCE GIRARDOT, citizen of France, residing at No. 7 Rue Ampère, Puteaux, Seine, France, have invented new and useful Improvements in Flexible and Elastic Shaft-Couplings, of which the following is a specification.

This invention has for its object a flexible and elastic joint adapted to be placed between two rotatable shafts arranged end to end and one of which is intended to drive the other, while admitting the possibility of slightly inclining one shaft with regard to the other. This special connection can in many cases with advantage replace a Cardan or universal joint, since while allowing, like the latter, relative displacement of the two shafts, it moreover insures elastic driving, without shock, at each starting or at each variation of speed. This joint is, for example particularly adapted for use in the transmission gear of automobile vehicles, between the motor shaft and the speed gear shaft.

In the annexed drawing, Figures 1 and 2 represent one form of joint constructed according to this invention in longitudinal section and sectional front view respectively. The flexible and elastic joint comprises two plates $a$ and $b$, one being fixed to the shaft $c$ to be driven, and the other to the motor or driving shaft $d$. These two plates are placed closely together and are connected with each other by a central universal joint formed by spherical bosses 1 and 2 fitting one within the other, and by the screw $f$, the head of which is also spherical. At its circumference, each of said plates has a wide groove 3 or 4 of semi-circular section, intersected at intervals by triangular projections or teeth 5 or 6, formed in one with the respective plate. These projections or teeth are equidistant, and the plates are so placed together that each tooth of one of them is placed midway between two teeth of the other plate, and a helical spring $g$ is placed between each two adjacent teeth, one of which belongs to one plate and the other to the other plate. The construction is completed by disks $h$ and $h'$ inserted between the teeth of the plates and the ends of the springs $g$, and by a ring $j$ on which are "threaded" all the springs and disks, and which allows of rapidly placing these parts in position and removing same. To permit of placing said ring in the axis of the chamber formed by the union of the semi-circular grooves 3 and 4, each tooth 5 or 6 is provided with an aperture $k$.

It will be understood that with a construction of this kind, the flexibility of the connection is insured by the ball-joint; moreover, at each starting, the teeth of the plate fixed to the driving shaft act on the teeth of the plate fixed to the driven shaft, by means of the springs $g$, so that the driving is elastic, and sudden shocks, with the disadvantages arising therefrom, are avoided.

Having now described my invention, what I claim as new and desire to secure by Letters Patent is:

A flexible and elastic shaft-coupling comprising in combination two plates $a$ and $b$ adapted to be fixed respectively to the adjacent ends of the shafts to be coupled, there being two sets of teeth of triangular section 5 and 6 made respectively integral with said plates at their circumference and meshing with each other without making contact, each of said teeth being recessed in its outer edge, springs $g$ arranged between the side faces of successive teeth, washers $h$ and $h'$ located between the ends of the springs and the said faces of the teeth, a movable ring $j$ on which are threaded all the springs and washers, said ring lying in the recesses in the teeth, there being spherical bosses 1 and 2 formed respectively in the plates $a$ and $b$, and a spherical headed screw $f$ screwed into one of the plates $a$ and adapted to connect both plates together though admitting their slight inclination one with regard to the other, substantially as described and for the purpose set forth.

In testimony whereof I have signed my name to this specification in the presence of two subscribing witnesses.

LÉONCE GIRARDOT.

Witnesses:
 ANTOINE LAVOIX,
 HANSON C. COXE.